(12) United States Patent
Kusumoto et al.

(10) Patent No.: US 6,333,577 B1
(45) Date of Patent: Dec. 25, 2001

(54) AUTOMOTIVE AC DYNAMO-ELECTRIC MACHINE

(75) Inventors: Katsuhiko Kusumoto; Tsunenobu Yamamoto; Keiichi Konishi; Yoshinobu Utsumi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/690,759

(22) Filed: Oct. 18, 2000

(30) Foreign Application Priority Data

Apr. 14, 2000 (JP) ............................................. 2000-114266

(51) Int. Cl.$^7$ .............................. H02K 7/10; H02K 7/06; H02K 49/00; H02K 51/00
(52) U.S. Cl. ...................... 310/102 R; 310/100; 310/99; 310/98; 310/78; 310/83
(58) Field of Search .................................. 310/102 R, 92, 310/93, 94, 95, 96, 97, 98, 99, 100, 102 A, 75 R, 76, 77, 78

(56) References Cited

U.S. PATENT DOCUMENTS

6,184,603 * 2/2001 Hamai et al. ..................... 310/75 R

FOREIGN PATENT DOCUMENTS

9-172753  6/1997 (JP) .............................. H02K/7/108

* cited by examiner

Primary Examiner—Nestor Ramirez
Assistant Examiner—Guillermo Perez
(74) Attorney, Agent, or Firm—Sughrue Mion, PLLC

(57) ABSTRACT

An automotive AC dynamo-electric machine is capable of providing a sufficient rotational output for starting an engine by running a rotor at high speed in a motor operation mode for starting the engine, thus obviating the need for increasing a size thereof. In the motor operation mode, an electromagnetic clutch follower connects to an electromagnetic clutch main body and also engages a cylindrical member to brake the cylindrical member. An internal gear portion provides a fixed element, and torque of a rotor is transmitted to a power transmission device via a rotor shaft, a sun gear, a planetary gear, and a carrier.

19 Claims, 14 Drawing Sheets

AUTOMOTIVE AC DYNAMO-ELECTRIC MACHINE

BACKGROUND OF THE INVENTION

1. Field of the Invention

The present invention relates to an automotive AC dynamo-electric machine capable of bidirectionally transmitting motive power to and from an engine via a power transmission device, and also capable of starting the engine by implementing a motor operation mode and of supplying electric power to a vehicle by implementing a generator operation mode.

2. Description of the Related Art

FIG. 14 is a sectional view showing a conventional automotive AC dynamo-electric machine (hereinafter referred to as a "dynamo-electric machine"). The dynamo-electric machine includes a bracket 80, a Lundell-type rotor 200 secured to a rotor shaft 12 provided in the bracket 80, a stator 101 secured to an inner wall surface of the bracket 80, a slip ring 15 secured to an end of the rotor shaft 12 and which supplies current to the rotor 200, a pair of brushes 13 that slide on the surface of the slip ring 15, and a brush holder 102 that accommodates the brushes 13 and springs 14 pressing the brushes 13.

The rotor 200 has a field winding 11 that generates magnetic fluxes as current flows therethrough, and a rotor iron core 10 that covers the field winding 11. The stator 101 has a stator iron core 1 through which the magnetic fluxes from the field winding 11 pass and which is composed of a plurality of layers of steel plates, and a three-phase stator winding 2 through which three-phase alternating current passes.

An operation of the dynamo-electric machine having the aforesaid construction will now be described.

When the engine is started, the dynamo-electric machine acts as a motor to supply AC current to the stator winding 2. This generates torque in the rotor 200, and the torque is transmitted to a V-belt (not shown) wound on a pulley 60, which is a component of the power transmission device, thus starting the engine.

When electric power is supplied to a vehicle, the dynamo-electric machine acts as a generator. The power from an engine rotates the rotor 200 via the pulley 60 and the rotor shaft 12. At this time, current is being supplied from a battery (not shown) to the field winding 11 of the rotor 200 via the brushes 13 and the slip ring 15, and therefore magnetic fluxes are being generated. The rotation of the rotor 200 causes the magnetic fluxes to interlink the three-phase stator winding 2, and an electromotive force is generated in the three-phase stator winding 2, supplying electric power to the vehicle.

In the dynamo-electric machine having the construction set forth above, a pulley ratio (a ratio of an engine pulley diameter to a dynamo-electric machine pulley diameter) in the belt of the power transmission device is set to about 2 at maximum in order to prevent slippage of the belt and to secure a sufficient dimension of the pulley 60 for winding the belt around it so as to securely transmit the torque to the engine when starting the engine.

In the above dynamo-electric machine, a ratio of a number of revolutions of the dynamo-electric machine to a number of revolutions of the engine in both operation modes remains unchanged. When the pulley ratio is considered, in order to obtain adequate rotational output required for starting the engine, the dynamo-electric machine must be made larger because of an expression shown below, presenting a problem in that the dynamo-electric machine becomes too large to be mounted in a vehicle:

Rotational output (W) (Outside dia. of rotor)$^2$×Volume of stator iron core=Volume of dynamo-electric machine

SUMMARY OF THE INVENTION

Accordingly, the present invention has been made with a view toward solving the problem described above, and it is an object thereof to provide an automotive AC dynamo-electric machine capable of providing a sufficient rotational output for starting an engine by running a rotor at high speed in a motor operation mode for starting the engine, obviating the need for increasing a size thereof.

To this end, according to the present invention, there is provided an automotive AC dynamo-electric machine, wherein in the motor operation mode, the electromagnetic clutch follower connects to the electromagnetic clutch main body and also engages the cylindrical member to brake the cylindrical member, and the internal gear portion provides a fixed element, so that torque of the rotor is transmitted to the power transmission device via the rotor shaft, the sun gear, the planetary gear, and the carrier; and in the generator operation mode, the electromagnetic clutch follower disconnects from the electromagnetic clutch main body, and torque from the power transmission device is transmitted to the rotor via the carrier, the planetary gear shaft, the carrier support shaft, the one-way clutch, and the rotor shaft so as to rotate the rotor.

According to another aspect of the present invention, there is provided an automotive AC dynamo-electric machine, wherein in the motor operation mode, the electromagnetic clutch follower connects to the electromagnetic clutch main body and also engages the cylindrical member to brake the cylindrical member, and the internal gear portion provides a fixed element, so that torque of the rotor is transmitted to the power transmission device via the rotor shaft, the sun gear, the planetary gear, and the carrier; and in the generator operation mode, the electromagnetic clutch follower disconnects from the electromagnetic clutch main body, and torque from the power transmission device causes the carrier, the one-way clutch, the cylindrical member, the planetary gear, the sun gear, and the rotor shaft to rotate at the same rotational speed so as to rotate the rotor.

According to still another aspect of the present invention, there is provided an automotive AC dynamo-electric machine, wherein in the motor operation mode, the electromagnetic clutch follower connects to the electromagnetic clutch main body and also engages the cylindrical member to brake the cylindrical member, and the internal gear portion provides a fixed element, so that torque of the rotor is transmitted to the power transmission device via the rotor shaft, the sun gear, the planetary gear, and the carrier; and in the generator operation mode, the electromagnetic clutch follower disconnects from the electromagnetic clutch main body, and torque from the power transmission device causes the carrier, the one-way clutch, the sun gear, and the rotor shaft to rotate so as to rotate the rotor.

DESCRIPTION OF THE PREFERRED EMBODIMENTS

First Embodiment

Figure 1:
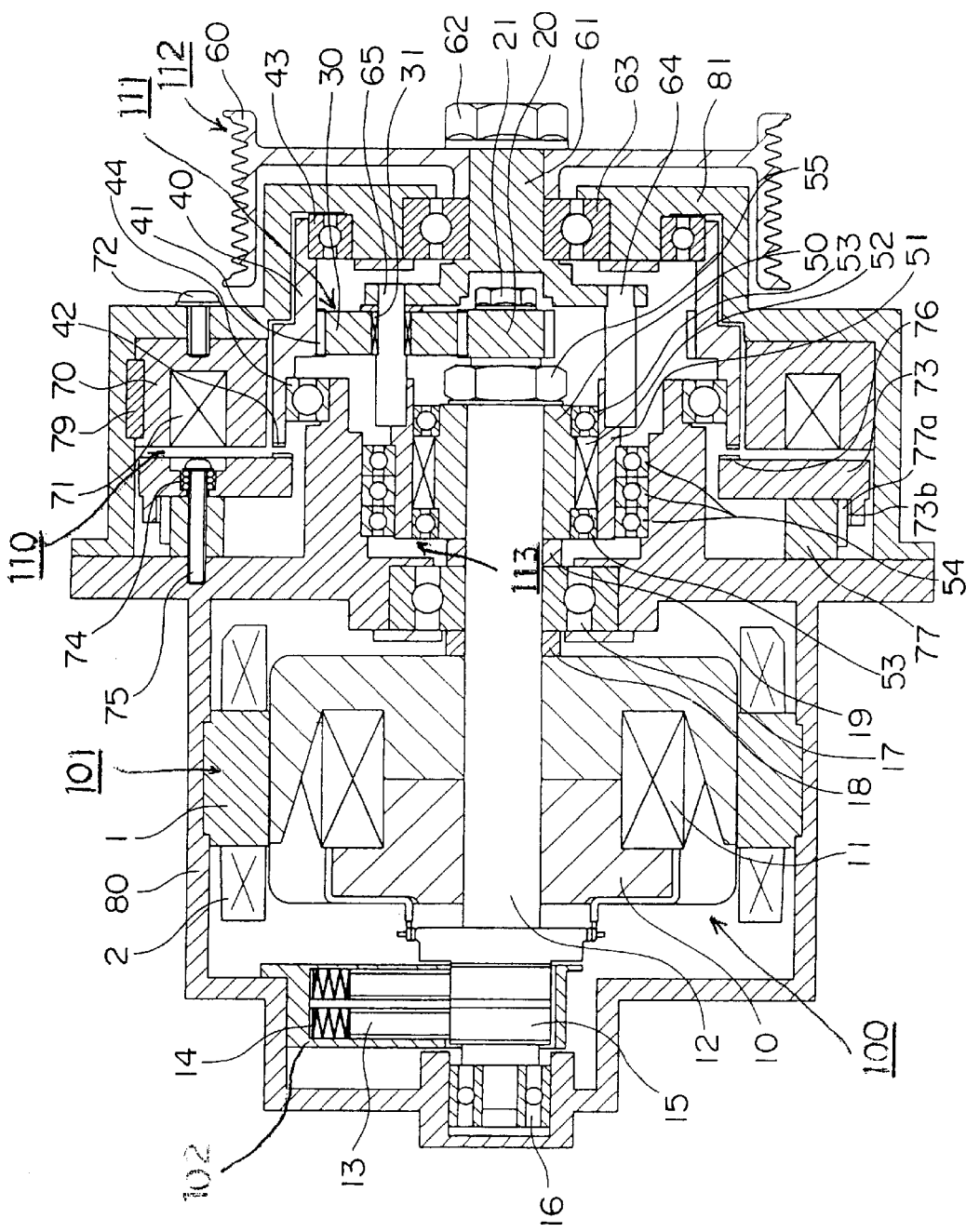
FIG. 1 is a sectional view showing an automotive AC dynamo-electric machine according to a first embodiment in accordance with the present invention.

FIG. 1 is a sectional view showing an automotive AC dynamo-electric machine (hereinafter referred to as a "dynamo-electric machine") according to a first embodiment of the present invention.

The dynamo-electric machine includes a first bracket 80, a Lundell-type rotor 100 secured to a rotor shaft 12 provided in the first bracket 80, a stator 101 secured to an inner wall surface of the first bracket 80, a slip ring 15 secured to an end of the rotor shaft 12 and which supplies current to the rotor 100, a pair of brushes 13 that slide on the surface of the slip ring 15, and a brush holder 102 that accommodates the brushes 13 and springs 14 pressing the brushes 13.

The rotor 100 has a field winding 11 that generates magnetic fluxes as current passes therethrough, and a rotor iron core 10 that covers the field winding 11. The stator 101 has a stator iron core 1 through which the magnetic fluxes from the field winding 11 pass and which is composed of a plurality of layers of steel plates, and a three-phase stator winding 2 through which three-phase alternating current passes.

The dynamo-electric machine is further equipped with an electromagnetic clutch 110, a planetary gear assembly 111, a power transmission device 112, and a one-way clutch 113 secured to an end of the rotor shaft 12 provided in a second bracket 81.

The electromagnetic clutch 110 includes: an electromagnetic clutch main body 70 secured to the second bracket 81 by a fixing screw 72 and a fixing key 79; a field coil 71 provided in the electromagnetic clutch main body 70; an electromagnetic clutch follower 73 which is secured by a fixing screw 75 via a retainer 77 of the first bracket 80, opposes the electromagnetic clutch main body 70, and has an engaging portion 76 on its inside diameter portion; and a spring 74 provided between the electromagnetic clutch follower 73 and a head of the fixing screw 75 to urge the electromagnetic clutch follower 73 in an opposite direction from the electromagnetic clutch main body 70. A guiding surface 77a is formed on an outer periphery of the retainer 77. The electromagnetic clutch follower 73 is installed to the retainer 77 such that a guiding surface 73b formed on an inner periphery of the electromagnetic clutch follower 73 slides on the guiding surface 77a in an axial direction. The retainer 77 of the first bracket 80 may be formed integrally with the first bracket 80 rather than making these as discrete components.

The planetary gear assembly 111 includes: a sun gear 20 made integral with the rotor shaft 12; a cylindrical member 40 which has on its end surface an engaging portion 42 that engages the engaging portion 76 of the electromagnetic clutch main body 70 and has an internal gear portion 41 on its internal wall surface; a bearing 44 provided between one end of the cylindrical member 40 and an end of the first bracket 80; a bearing 43 provided between the other end of the cylindrical member 40 and the second bracket 81; a planetary gear 30 meshed with the internal gear portion 41 and the sun gear 20; a planetary gear shaft 65 penetrating a central portion of the planetary gear 30 via a bearing 31; and a carrier 61 which rotatably supports the planetary gear 30 via the planetary gear shaft 65 and which is supported by a support shaft 64. There is a bearing 63 between the carrier 61 and the second bracket 81, the carrier 61 being supported so that it may be rotated with respect to the second bracket 81.

The power transmission device 112 has a pulley 60 secured to the carrier 61 by a nut 62.

The one-way clutch 113 is provided with a driving assembly 51 provided in the first bracket 80 via a bearing 54, a cam 52 provided inside the driving assembly 51, bearings 53 provided on both sides of the cam 52, and a follower 50 secured to the rotor shaft 12.

In FIG. 1, reference numerals 16 and 17 denote bearings, 18 and 19 denote spacers, and 21 and 55 denote nuts.

An operation of the dynamo-electric machine having the construction set forth above will now be described.

First, the operation of the dynamo-electric machine in a motor operation mode will be described. At a start of an engine, the field coil 71 of the electromagnetic clutch 110 is energized, the electromagnetic clutch follower 73 connects to the electromagnetic clutch main body 70 against an elastic force of the spring 74, and the serrated engaging portion 76 of the electromagnetic clutch follower 73 engages the serrated engaging portion 42 of the cylindrical member 40. As a result, the internal gear portion 41 of the cylindrical member 40 becomes a fixed element, making it possible to accomplish speed reduction based on a ratio of a number of teeth of the planetary gear assembly 111 (about 3 to about 5). Torque of the rotor 100 uses the sun gear 20 as an input element, and rotation of the sun gear 20 causes the planetary gear 30 to revolve around the sun gear 20 while rotating around the planetary gear shaft 65. As the planetary gear 30 revolves, the pulley 60 made integral with the carrier 61 rotates, using the carrier 61 as an output element, and the torque is transmitted to the engine via a V-belt (not shown) wound on the pulley 60, thereby starting the engine. At this time, the driving assembly 51 of the one-way clutch 113 runs idle with respect to the follower 50, preventing the torque from being transmitted to the carrier 61 via the one-way clutch 113, the carrier support shaft 64, and the planetary gear shaft 65.

Hence, with respect to a rotational speed of the rotor 100, the engine is driven at a product of the speed reduction ratio (about 3 to about 5) of the planetary gear assembly 111 and a speed reduction ratio (nearly 2) of the power transmission device 112.

The torque of the rotor 100 is obtained as follows: exciting current is supplied to the field winding 11 via a battery (not shown), the brushes 13, and the slip ring 15 thereby to produce magnetic fluxes in the rotor iron core 10, and under this condition, a three-phase AC current is supplied to the three-phase stator winding 2.

The operation of the dynamo-electric machine in a generator operation mode will now be described.

When electric power is supplied in the generator operation mode, current supplied to the field coil 71 of the electromagnetic clutch 110 is shut off to cause the electromagnetic clutch follower 73 to disconnect from the electromagnetic clutch main body 70 by the elastic force of the spring 74. This releases an engagement between the engaging portion 76 of the electromagnetic clutch follower 73 and the engaging portion 42 of the cylindrical member 40, thus allowing the cylindrical member 40 to rotate. In this state, motive power from the engine is transmitted to the carrier 61, which is an input element, via the power transmission device 112. The motive power is then transmitted to the follower 50 via the planetary gear shaft 65, the carrier support shaft 64, and the driving assembly 51 of the one-way clutch 113, thus rotating the rotor 100 via the rotor shaft 12.

Accordingly, the rotor 100 is driven at a speed reduction ratio (about 2) of the power transmission device 112 with respect to a rotational speed of the engine.

Meanwhile, current is supplied from a battery (not shown) to the field winding 11 via the brushes 13 and the slip ring 15, generating magnetic fluxes with a resultant magnetic field. The rotation of the rotor 100 causes the magnetic fluxes to interlink the three-phase stator winding 2 of the stator iron core 1, and an electromotive force is generated in the three-phase stator winding 2. Thus, output current passes to an external load connected to the dynamo-electric machine.

The dynamo-electric machine having the construction set forth above is provided with a controller for carrying out control so that, in the motor operation mode, an energizing command for braking the cylindrical member 40 by energizing the field coil 71 of the electromagnetic clutch main body 70 is issued with the engine at rest. This arrangement permits smooth engagement without damaging the engaging portions 42 and 76 at the time of engagement.

Furthermore, the dynamo-electric machine is equipped with a controller for conducting control so that, in the generator operation mode, a current supply cut-off command for cutting off supply of current to the field coil 71 of the electromagnetic clutch main body 70 to release the cylindrical member 40 is issued after a start of the engine is detected. This arrangement prevents a start failure caused by erroneous switching from a start mode to a power generation mode.

In the dynamo-electric machine according to the first embodiment, the electromagnetic clutch follower 73 is connected to the electromagnetic clutch main body 70 and engages the cylindrical member 40 thereby to brake the cylindrical member 40 in the motor operation mode. Hence, the internal gear portion 41 becomes the fixed element, and the torque of the rotor 100 is transmitted to the power transmission device 112 via the rotor shaft 12, the sun gear 20, the planetary gear 30, and the carrier 61. With respect to the rotational speed of the rotor 100, the engine is driven at a product of the speed reduction ratio of the planetary gear assembly 111 (about 3 to about 5) and the speed reduction ratio (nearly 2) of the power transmission device 112. Thus, sufficiently high torque required for starting the engine can be obtained by rotating the rotor 100 at high speed, obviating the need for increasing the size of the dynamo-electric machine.

Furthermore, since the serrated engaging portions 42 and 76 are used as the engaging means of the cylindrical member 40 and the electromagnetic clutch follower 73, the internal gear portion 41 of the cylindrical member 40 can be securely turned into a fixed element without adding to a size of the electromagnetic clutch 110. A weight of the cylindrical member 40 can be reduced by making its wall thinner, and load acting on the bearings 43 and 44 can be reduced accordingly, with resultant improved reliability of the bearings 43 and 44.

Moreover, the carrier 61 is rotatably supported by the second bracket 81 via the bearing 63, and the one-way clutch 113 is rotatably supported by the first bracket 80 via the bearing 54. The carrier 61 and the one-way clutch 113 are combined into one piece via the carrier support shaft 64 and the planetary gear shaft 65. With this arrangement, rigidity of the planetary gear assembly 111 and the one-way clutch 113 is improved, and troubles, such as damage to tooth surfaces caused by, for example, uneven contact of tooth surfaces of the internal gear portion 41 can be reduced.

Moreover, a radial length of a fixed engaging portion 76 of the cylindrical member 40 is different from a radial length of a movable engaging portion 42 of an electromagnetic clutch follower 73. Therefore, even if the two serrated engaging portions 76, 42 are misaligned in the axial direction, the misalignment can be absorbed, thereby ensuring reliable engagement and disengagement of the engaging portions.

Second Embodiment

In descriptions of the dynamo-electric machines according to the embodiments discussed below, similar or equivalent components to those of the first embodiment will be assigned similar reference numerals.

Figure 2:
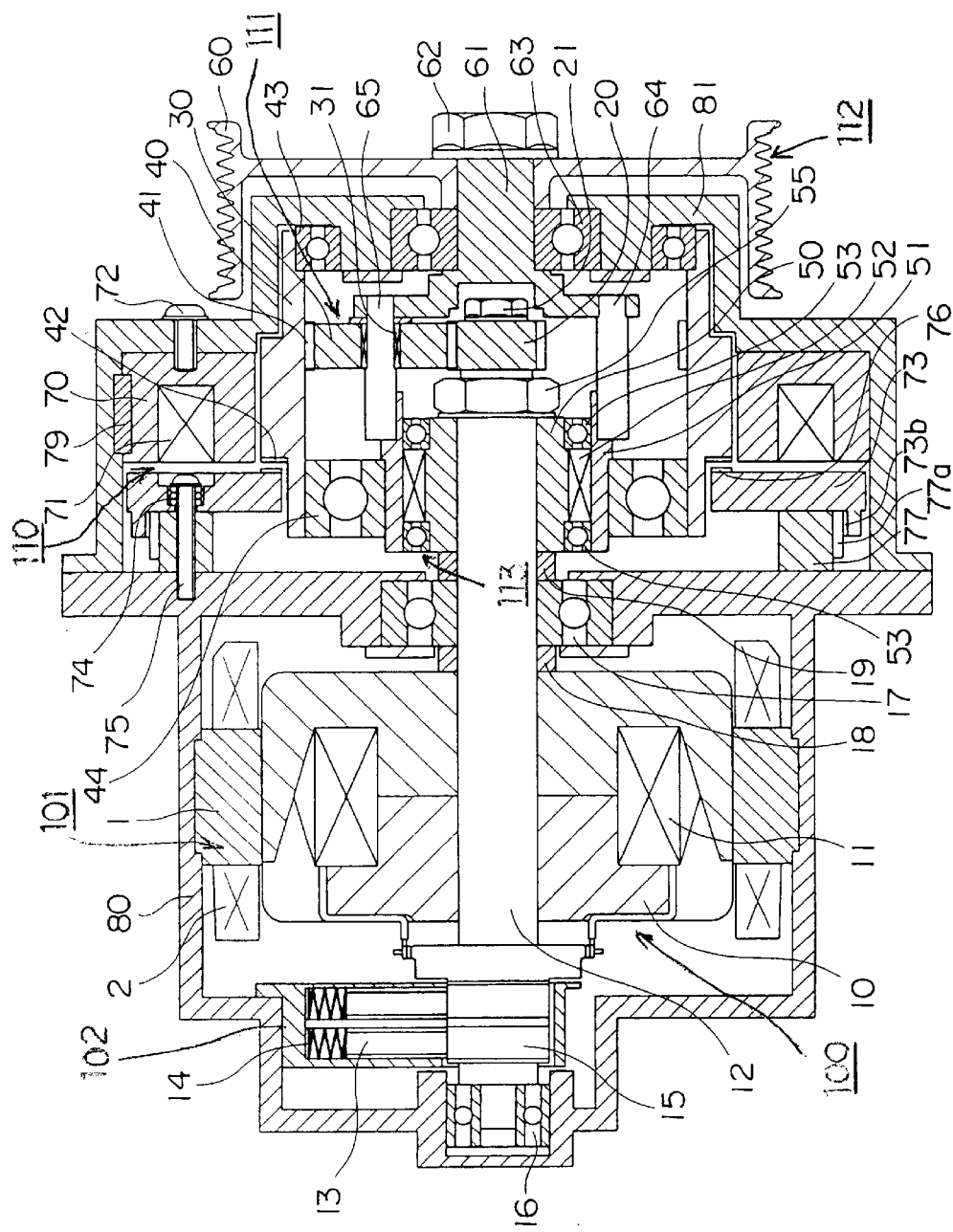
FIG. 2 is a sectional view showing an automotive AC dynamo-electric machine according to a second embodiment in accordance with the present invention.

FIG. 2 is a sectional view of a dynamo-electric machine according to a second embodiment of the present invention. The second embodiment is different from the first embodiment in that an outer surface of a driving assembly 51 of a one-way clutch 113 is in close contact with an inner ring of a bearing 44, and an inner wall surface of a cylindrical member 40 is in close contact with an outer ring of the bearing 44.

In the second embodiment, the bearing 44 rotatably supports the one-way clutch 113 and the cylindrical member 40. Since the bearing 44 rotatably supports both the one-way clutch 113 and the cylindrical member 40, a total number and weight of used bearings can be reduced.

Third Embodiment

Figure 3:
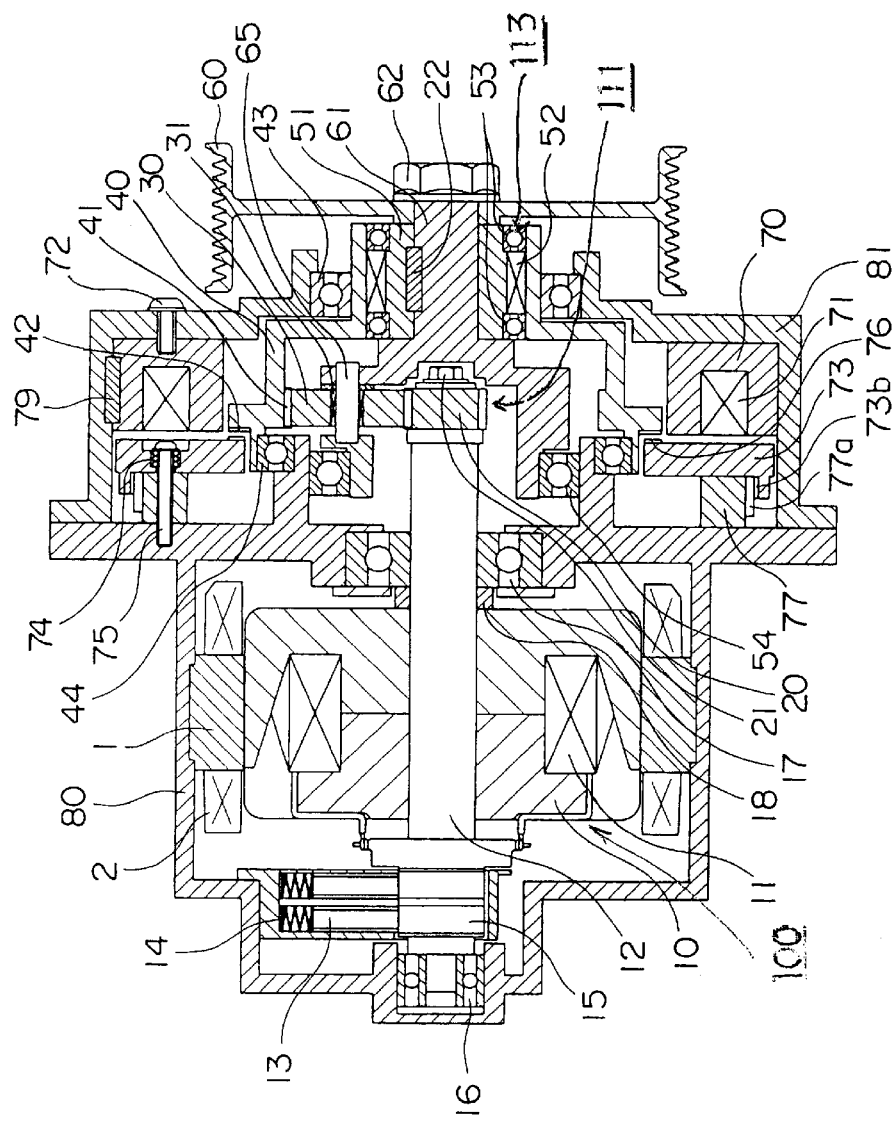
FIG. 3 is a sectional view showing an automotive AC dynamo-electric machine according to a third embodiment in accordance with the present invention.

FIG. 3 is a sectional view of a dynamo-electric machine according to a third embodiment of the present invention.

In the dynamo-electric machine according to the third embodiment, a one-way clutch 113 is provided between a carrier 61 and a cylindrical member 40. The one-way clutch 113 is equipped with a driving assembly 51 secured to the carrier 61 by a fixing key 22, a cam 52 provided outside the driving assembly 51, and bearings 53 located between the cylindrical member 40 and the driving assembly 51 at both sides of the cam 52. One end of the cylindrical member 40 is rotatably supported by a second bracket 81 via a bearing 43, and the other end of the cylindrical member 40 is rotatably supported by a first bracket 80 via a bearing 54.

When the dynamo-electric machine having the aforesaid construction is in a motor operation mode, at a start of an engine, a field coil 71 of an electromagnetic clutch 110 is energized, and the electromagnetic clutch follower 73 is connected to an electromagnetic clutch main body 70 against an elastic force of a spring 74, and an engaging portion 76 of the electromagnetic clutch follower 73 engages an engaging portion 42 of the cylindrical member 40. As a result, an internal gear portion 41 of the cylindrical member 40 becomes a fixed element, making it possible to accomplish speed reduction based on a ratio of a number of teeth of the planetary gear assembly 111 (about 3 to about 5). Torque of a rotor 100 uses a sun gear 20 as an input element, and rotation of the sun gear 20 causes a planetary gear 30 to revolve around the sun gear 20 while rotating around a planetary gear shaft 65. As the planetary gear 30 revolves, a pulley 60 made integral with the carrier 61 rotates, using the carrier 61 as an output element, and the engine starts. At this time, the driving assembly 51 of the one-way clutch 113 runs idle with respect to the cylindrical member 40.

Hence, with respect to a rotational speed of a rotor 100, the engine is driven at a product of the speed reduction ratio (about 3 to about 5) of the planetary gear assembly 111 and a speed reduction ratio (nearly 2) of a power transmission device 112.

The operation of the dynamo-electric machine in a generator operation mode will now be described.

When electric power is supplied in the generator operation mode, current supplied to the field coil 71 of the electromagnetic clutch 110 is shut off to cause the electromagnetic clutch follower 73 to disconnect from the electromagnetic clutch main body 70 by the elastic force of the spring 74, releasing an engagement between the engaging portion 76 of the electromagnetic clutch follower 73 and the engaging portion 42 of the cylindrical member 40. This allows the cylindrical member 40 to rotate. In this state, power from the engine is transmitted to the carrier 61, which is an input element, via the pulley 60. In this rotational direction, the one-way clutch 113 is in an engagement mode; therefore, as the carrier 61 rotates, the cylindrical member 40, the planetary gear 30, and the sun gear 20 rotate, the sun gear 20 being a center, at the same number of revolutions (the carrier 61, the cylindrical member 40, and the planetary gear 30 are made integral). Thus, the rotor 100 rotates via the sun gear 20 meshed with the planetary gear 30 and a rotor shaft 12, producing an electromotive force in a three-phase stator winding 2.

In the third embodiment, one end of the carrier 61 and one end of the cylindrical member 40 are rotatably supported with respect to the second bracket 81 via the same bearing 43. Hence, a quantity of bearings can be reduced as compared with the dynamo-electric machines in the first and second embodiments described above.

Fourth Embodiment

Figure 4:
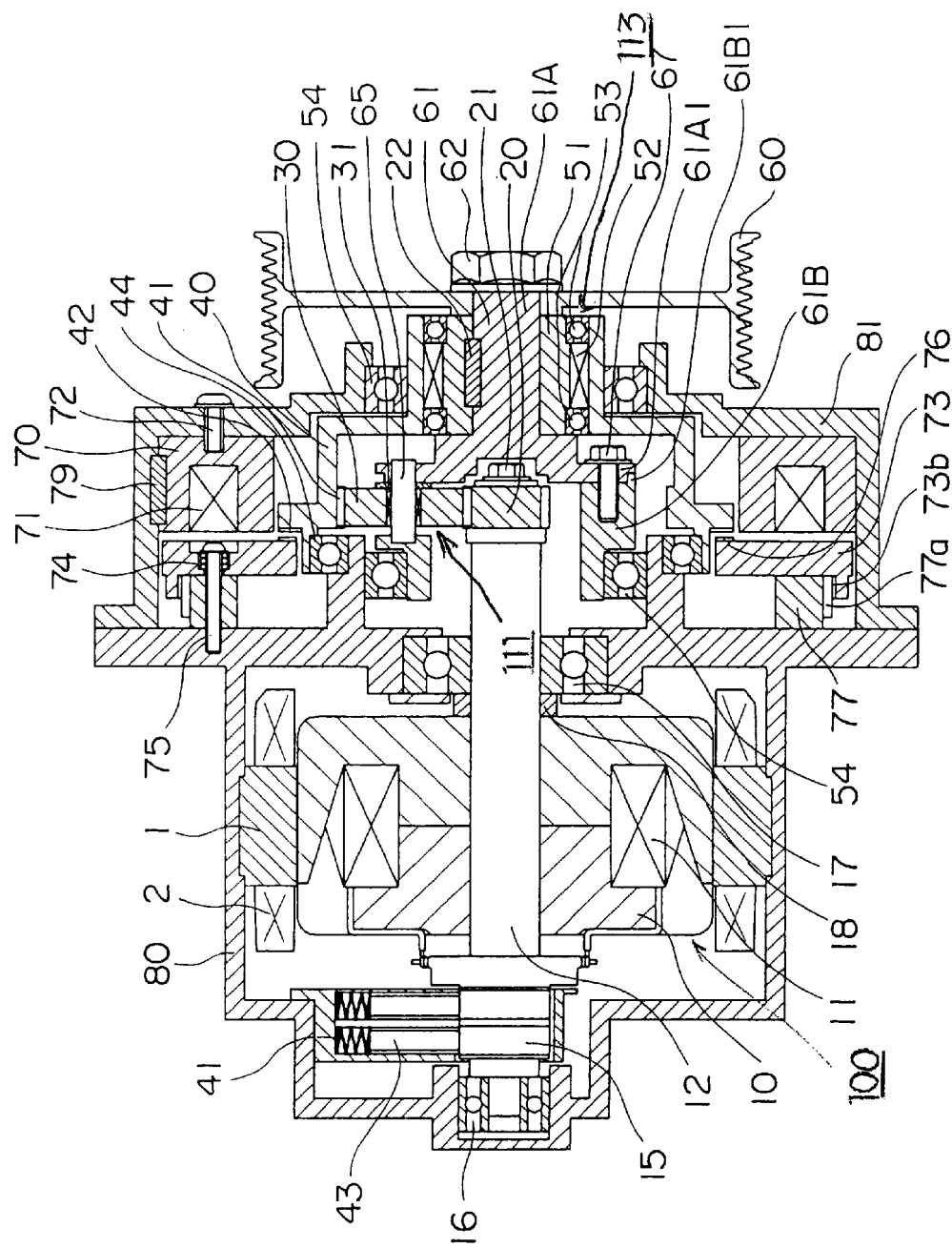
FIG. 4 is a sectional view showing an automotive AC dynamo-electric machine according to a fourth embodiment in accordance with the present invention.

FIG. 4 is a sectional view of a dynamo-electric machine according to a fourth embodiment of the present invention.

This embodiment differs from the third embodiment in that a carrier 61 is constituted by two components, namely, a first carrier member 61A and a second carrier member 61B, and the carrier members 61A and 61B are made integral with a screw 67. To securely engage the first carrier member 61A and the second carrier member 61B, an outer peripheral edge of the first carrier member 61A has a notch 61A1, while an outer peripheral edge of the second carrier member 61B has a protuberance 61B1.

According to the fourth embodiment, to install a planetary gear assembly 111 to a first bracket 80 to be assembled, the planetary gear assembly 111 is first attached to the second carrier member 61B via a bearing 54, then the first carrier member 61A, which is a counterpart of the second carrier member 61B, is secured to the second carrier member 61B with a screw 67 via a planetary gear 30 and a planetary gear shaft 65. This arrangement permits greater ease of installation.

Fifth Embodiment

Figure 5:
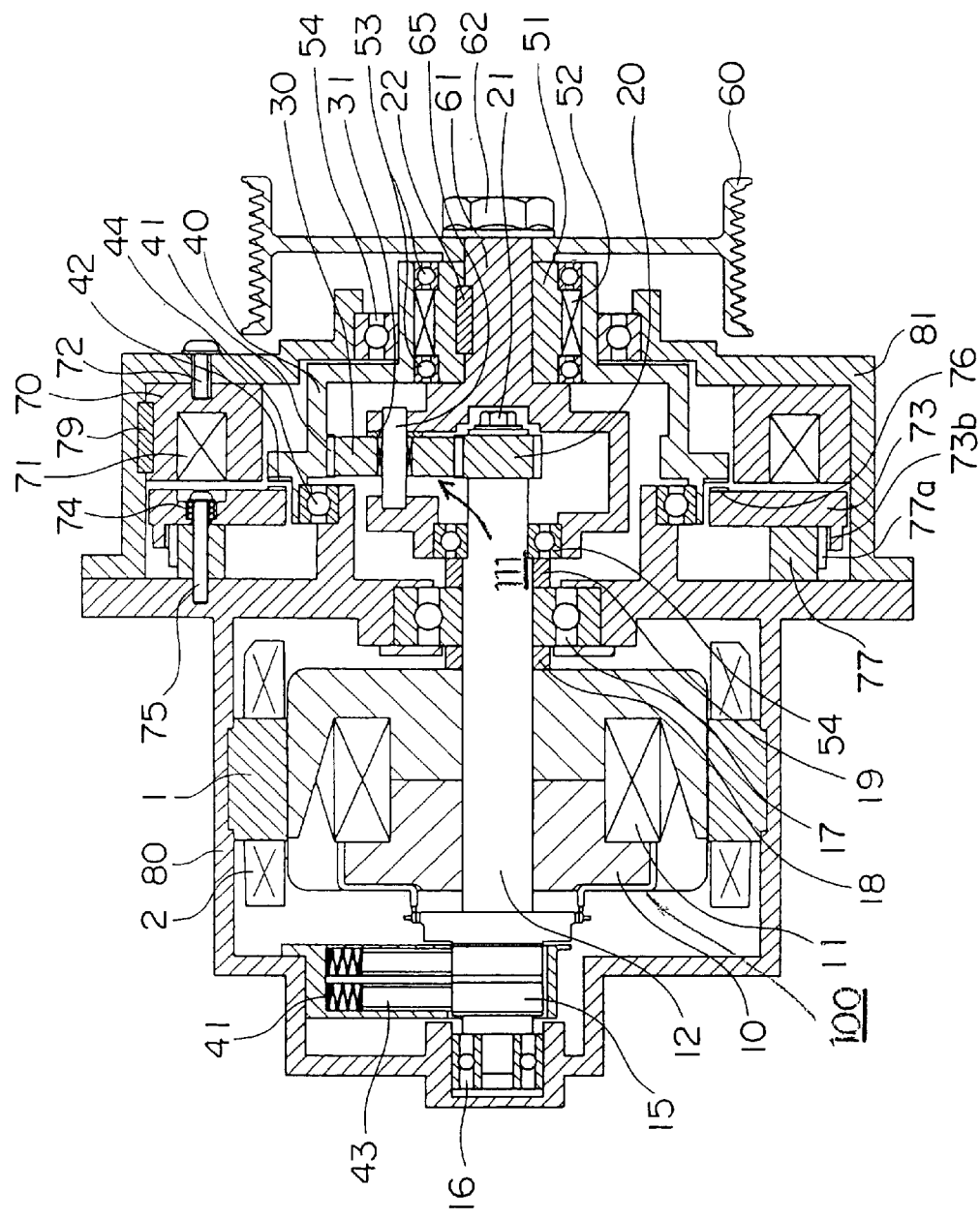
FIG. 5 is a sectional view showing an automotive AC dynamo-electric machine according to a fifth embodiment in accordance with the present invention.

FIG. 5 is a sectional view of a dynamo-electric machine according to a fifth embodiment of the present invention.

In the fifth embodiment, an end of a carrier 61 adjacent to a rotor 100 is rotatably supported by a bearing 54 secured to a rotor shaft 12.

Hence, as compared with the third and fourth embodiments set forth above wherein the end of the carrier 61 adjacent to the rotor 100 is rotatably supported by the bearing 54 secured to the first bracket 80, rigidity of the carrier 61 is improved, and a planetary gear 30 smoothly meshes with an internal gear portion 41 of a cylindrical member 40 and a sun gear 20, making it possible to prevent troubles, such as damage to tooth surfaces caused by uneven contact or the like.

Sixth Embodiment

Figure 6:
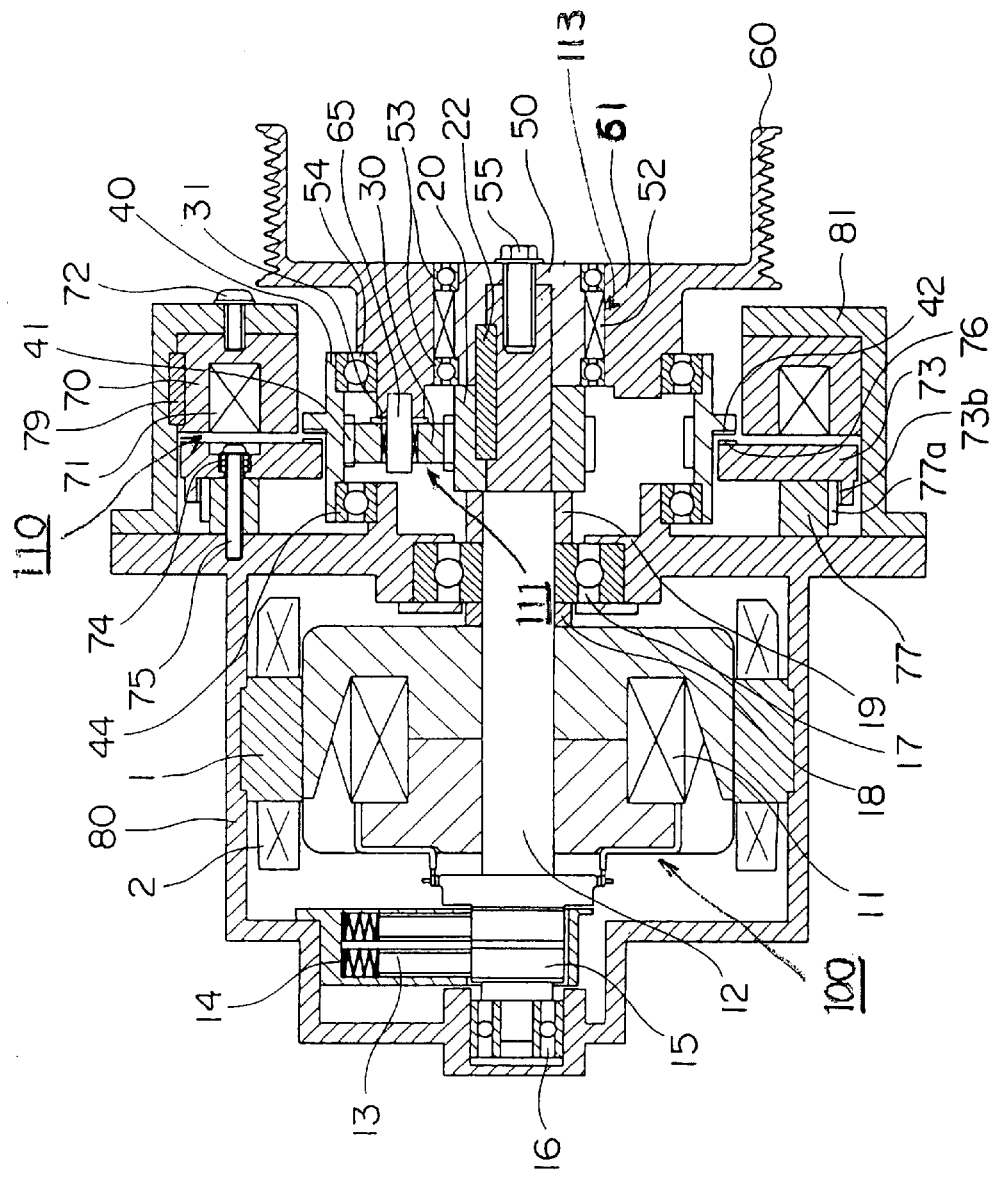
FIG. 6 a sectional view showing an automotive AC dynamo-electric machine according to a sixth embodiment in accordance with the present invention.

FIG. 6 is a sectional view of a dynamo-electric machine according to a sixth embodiment of the present invention.

In the dynamo-electric machine according to the sixth embodiment, a sun gear 20 and a follower 50 of a one-way clutch 113 are secured to an end of a rotor shaft 12 via a fixing key 22. A carrier 61 which rotatably supports a planetary gear 30 and is made integral with a pulley 60 is provided on an outer side of the one-way clutch 113 via a planetary gear shaft 65 penetrating a central portion of the planetary gear 30 in an axial direction. A bearing 54 is provided between an end of the carrier 61 and an end of a cylindrical member 40.

An operation of the dynamo-electric machine, which has the aforesaid construction, in a motor operation mode will be described. At a start of an engine, a field coil 71 of an electromagnetic clutch 110 is energized, and an electromagnetic clutch follower 73 is connected to an electromagnetic clutch main body 70 against an elastic force of a spring 74, and an engaging portion 76 of the electromagnetic clutch follower 73 engages an engaging portion 42 of the cylindrical member 40. As a result, an internal gear portion 41 of the cylindrical member 40 becomes a fixed element, making it possible to accomplish speed reduction based on a ratio of a number of teeth of the planetary gear assembly 111 (about 3 to about 5). Torque of a rotor 100 uses a sun gear 20 as an input element, and rotation of the sun gear 20 causes a planetary gear 30 to revolve around the sun gear 20 while rotating around a planetary gear shaft 65. As the planetary gear 30 revolves, the pulley 60 made integral with the carrier 61 rotates, using the carrier 61 as an output element, and the engine starts. At this time, the follower 50 of the one-way clutch 113 runs idle with respect to the driving assembly 51.

Hence, with respect to a rotational speed of a rotor 100, the engine is driven at a product of the speed reduction ratio (about 3 to about 5) of the planetary gear assembly 111 and a speed reduction ratio (nearly 2) of a power transmission device 112.

The operation of the dynamo-electric machine in a generator operation mode will now be described.

When power is supplied in the generator operation mode, current supplied to a field coil 71 of an electromagnetic clutch 110 is shut off to cause the electromagnetic clutch follower 73 to disconnect from the electromagnetic clutch main body 70 by the elastic force of the spring 74. This releases an engagement between an engaging portion 76 of the electromagnetic clutch follower 73 and an engaging portion 42 of the cylindrical member 40, allowing the cylindrical member 40 to rotate. In this state, motive power from the engine is transmitted to the carrier 61, which is an input element, via a power transmission device 112. In this rotational direction, the one-way clutch 113 is in an engagement mode; therefore, as the carrier 61 rotates, a rotor 100 rotates via an intermediary member 23 and a rotor shaft 12, producing an electromotive force in a three-phase stator winding 2.

In this embodiment, the carrier 61 is made integral with the pulley 60 and rotatably supported with respect to the cylindrical member 40 via the bearing 54 provided between the carrier 61 and the cylindrical member 40. Hence, the number of bearings can be reduced as compared with, for example, the dynamo-electric machine in the fifth embodiment wherein the carrier 61 is rotatably supported by a pair of bearings 54.

Seventh Embodiment

Figure 7:
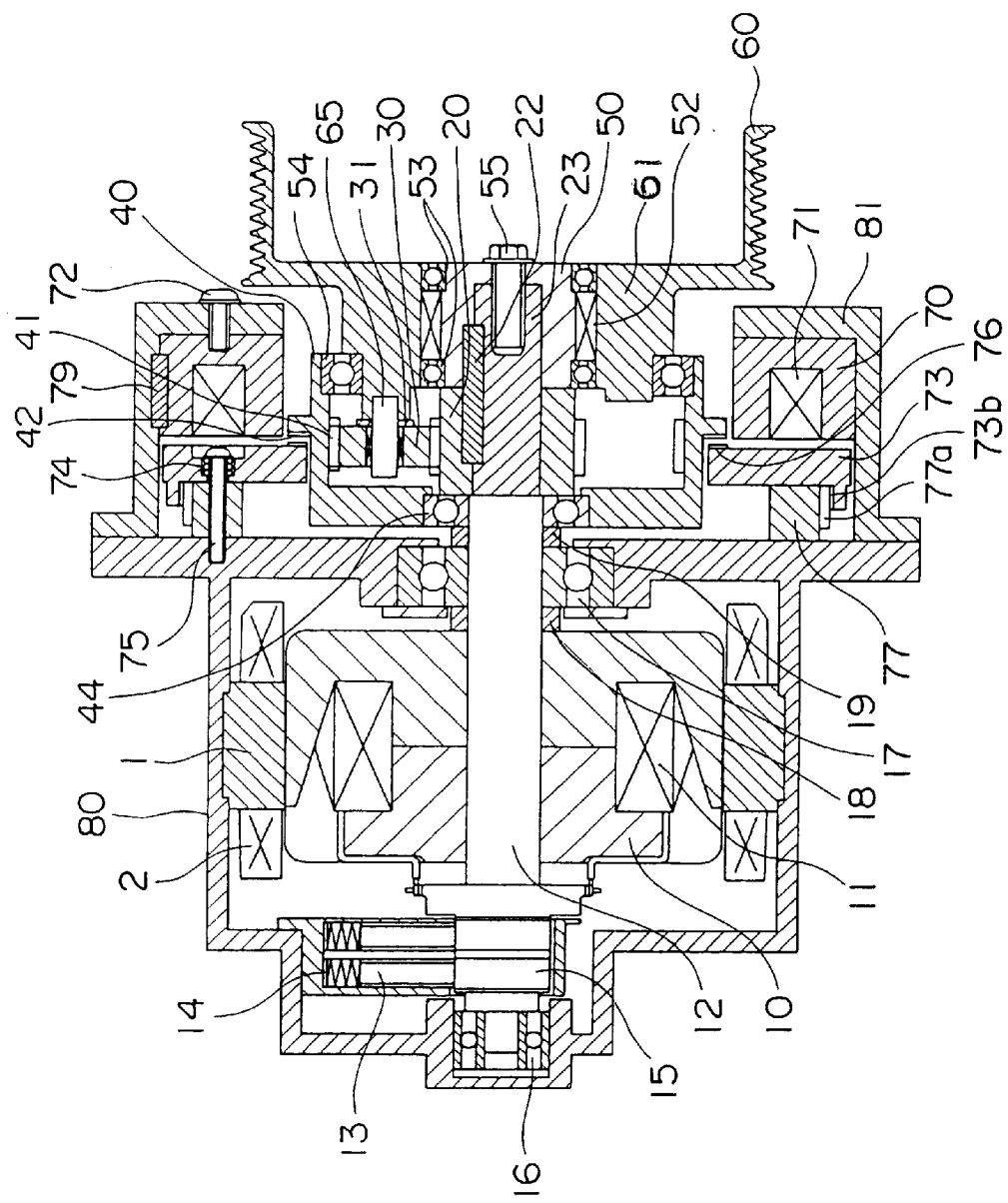
FIG. 7 is a sectional view showing an automotive AC dynamo-electric machine according to a seventh embodiment in accordance with the present invention.

FIG. 7 is a sectional view showing a dynamo-electric machine according to a seventh embodiment of the present invention.

This embodiment differs from the sixth embodiment in that a cylindrical member 40 has a bottom. The bottomed cylindrical configuration of the cylindrical member 40 improves rigidity of the cylindrical member 40, and a planetary gear 30 smoothly meshes with an internal gear portion 41 and a sun gear 20 of the cylindrical member 40. This arrangement permits prevention of damage or the like to tooth surfaces due to uneven contact or the like.

Eighth Embodiment

Figure 8:
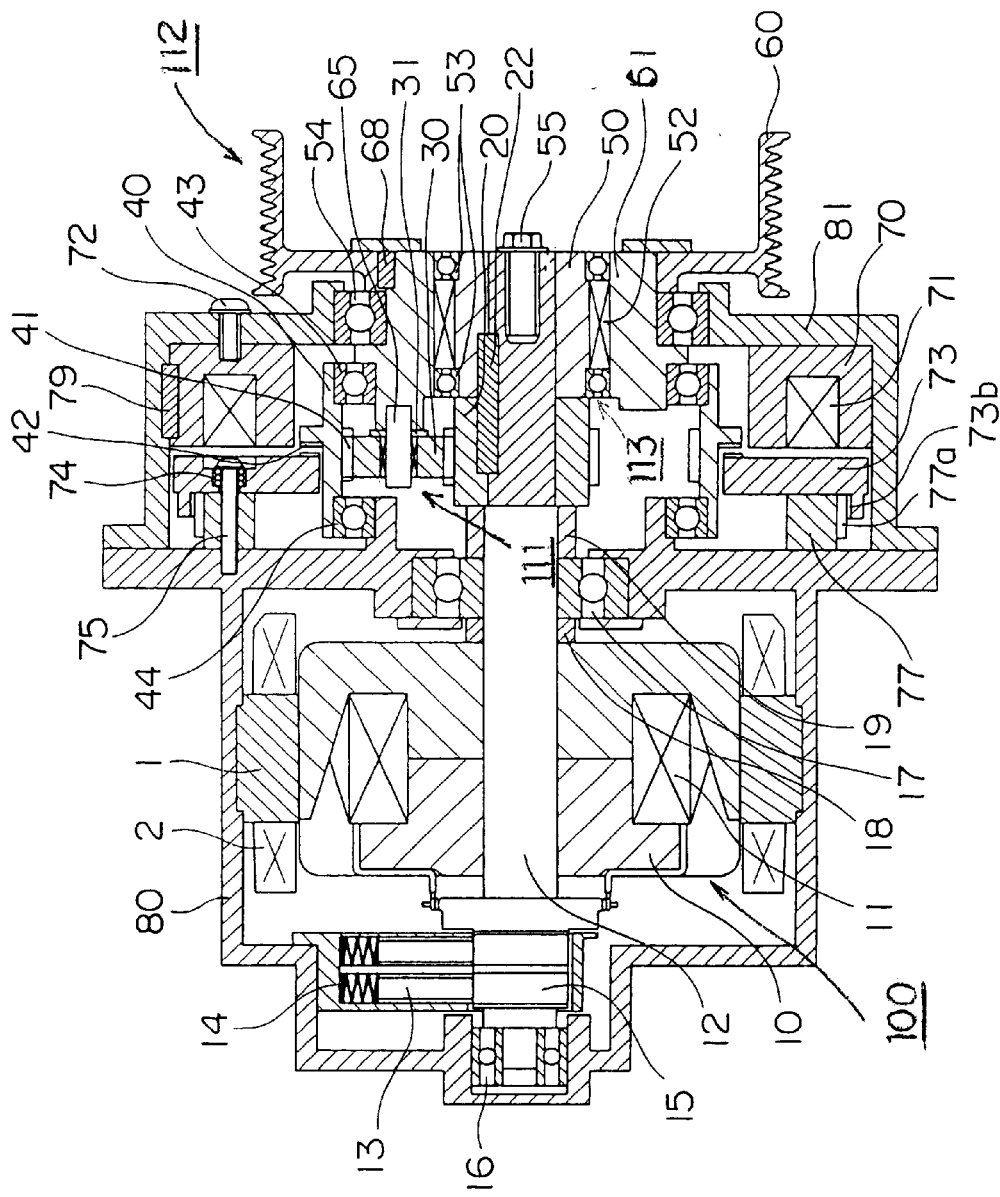
FIG. 8 is a sectional view showing an automotive AC dynamo-electric machine according to an eighth embodiment in accordance with the present invention.

FIG. 8 is a sectional view of a dynamo-electric machine according to an eighth embodiment of the present invention.

This embodiment differs from the sixth embodiment in that a pulley 60 is made integral with a carrier 61 via a fixing key 68, and the pulley 60 and the carrier 61 are rotatably supported by a second bracket 81 via a bearing 54.

In the eighth embodiment, moment load from belt tension acting on the pulley 60 is supported by the second bracket 81 via a bearing 54. With this arrangement, deformation of the carrier 61 attributable to load applied by a power transmission device 112 can be prevented, and a planetary gear 30 smoothly meshes with an internal gear portion 41 and a sun gear 20 of the cylindrical member 40, permitting prevention of damage or the like to tooth surfaces due to uneven contact or the like.

Ninth Embodiment

Figure 9:
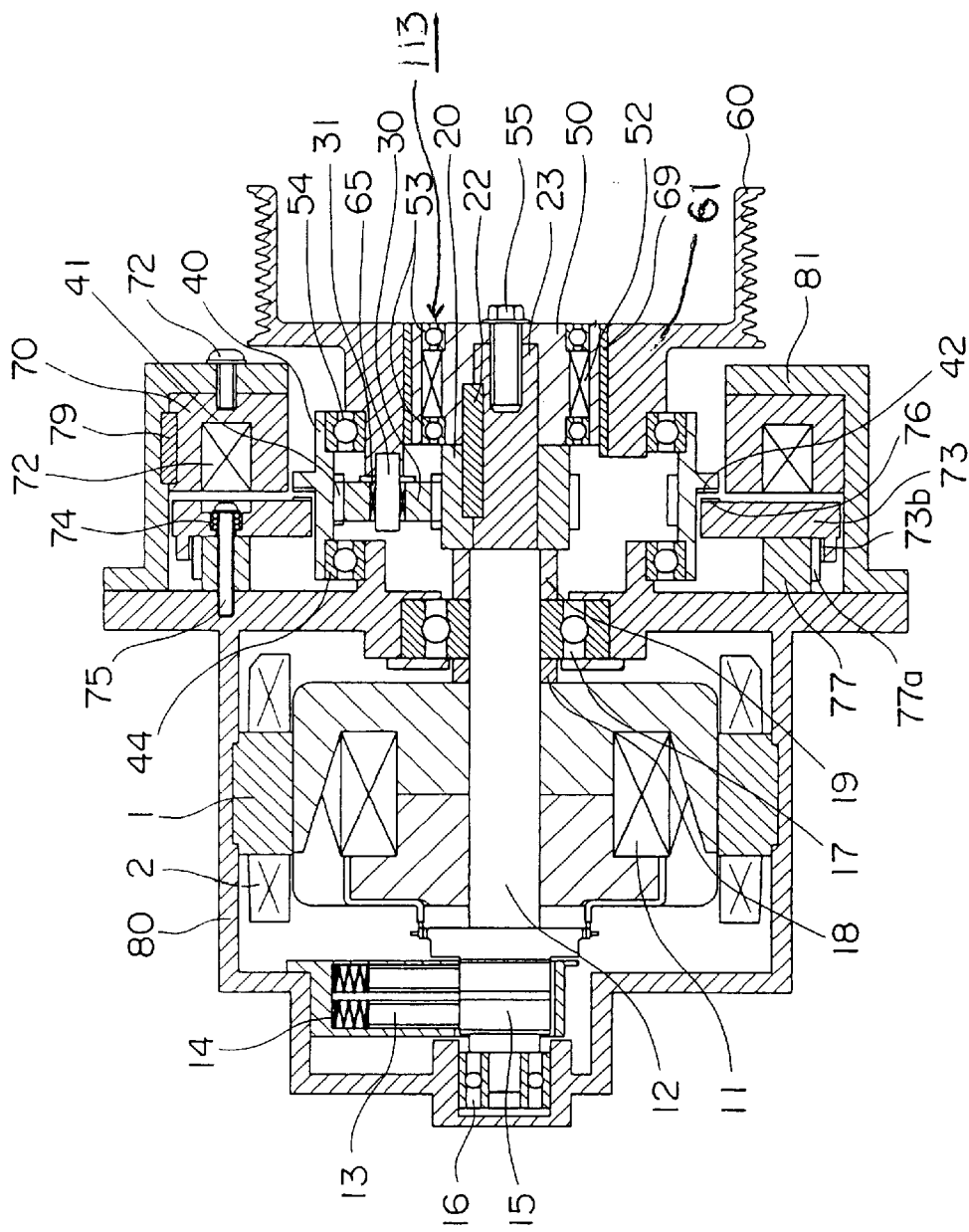
FIG. 9 is a sectional view showing an automotive AC dynamo-electric machine according to a ninth embodiment in accordance with the present invention.

FIG. 9 is a sectional view showing a dynamo-electric machine according to a ninth embodiment of the present invention.

This embodiment differs from the sixth embodiment in that a rubber component 69 is provided between a one-way clutch 113 and a carrier 61. The rubber component 69 is an elastic component serving as a vibration absorbing means for absorbing vibration and variations in rotation.

In the ninth embodiment, if variations in rotation or torque ripples attributable to intracylindrical explosions in an engine are transmitted to the one-way clutch 113, the one-way clutch 113 performs engaging and disengaging operations in response to the variations in rotation. Repeated engaging and disengaging operations may cause, for example, a coupling surface of a cam 52 of the one-way clutch 113, to fatigue and break. The rubber component 69 enables absorption of the variations in rotation, resulting in a prolonged service life of the one-way clutch 113. For the same reason, the rubber component 69 absorbs sudden variations in rotation or impact load at a start or stop of the engine, leading to a prolonged service life of the one-way clutch 113.

Tenth Embodiment

Figure 10:
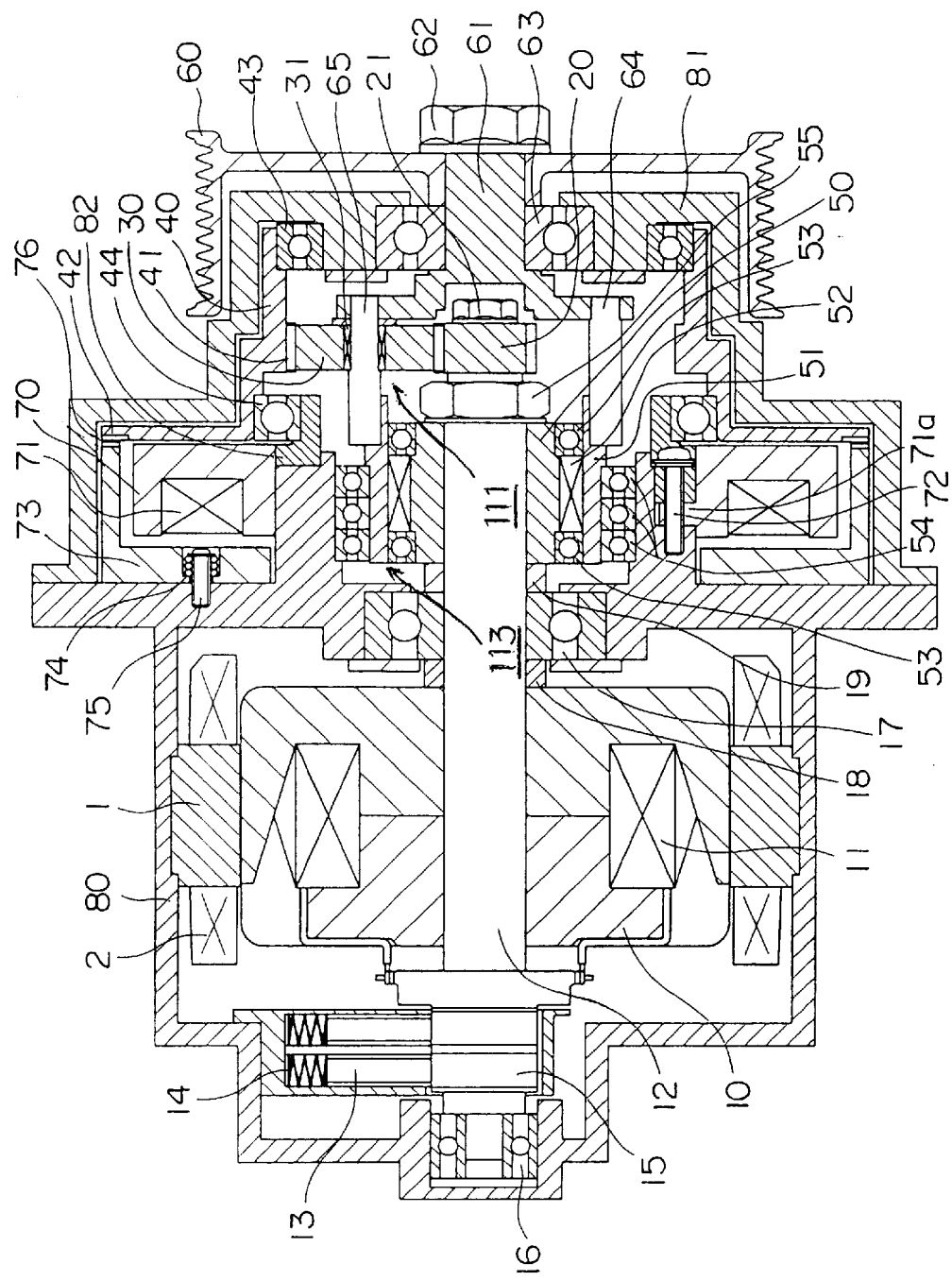
FIG. 10 is a sectional view showing an automotive AC dynamo-electric machine according to a tenth embodiment in accordance with the present invention.

FIG. 10 is a sectional view showing a dynamo-electric machine according to a tenth embodiment of the present invention.

This embodiment differs from the first embodiment in that an engaging portion 76 of an electromagnetic clutch follower 73 and an engaging portion 42 of a cylindrical member 40 can be engaged and disengaged at an outer periphery side of the electromagnetic clutch main body 70.

According to the tenth embodiment, an axial dimension of the dynamo-electric machine can be reduced as compared with the first embodiment.

Eleventh Embodiment

Figure 11:
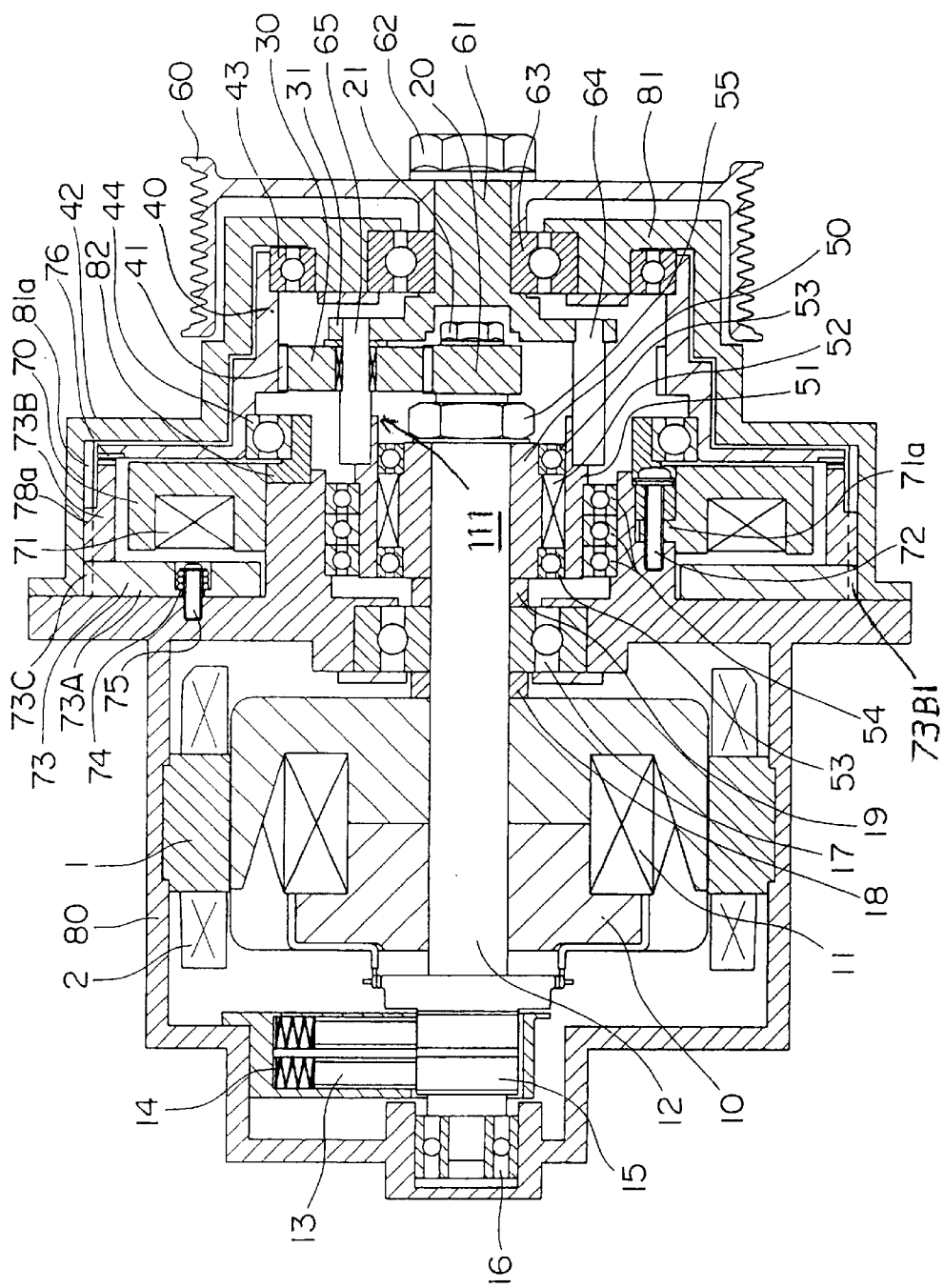
FIG. 11 is a sectional view showing an automotive AC dynamo-electric machine according to an eleventh embodiment in accordance with the present invention.

FIG. 11 is a sectional view showing a dynamo-electric machine according to an eleventh embodiment of the present invention.

This embodiment differs from the tenth embodiment in that an electromagnetic clutch follower 73 is constituted by an annular disc portion 73A which forms a magnetic circuit and is composed of a magnetic constituent, and a cylindrical portion 73B which is composed of an aluminum alloy (a nonferrous metal) and has an engaging portion 76 on its end surface. This embodiment differs from the tenth embodiment also in that a second bracket 81 has a concavo-convex guiding surface 81a, and an outer peripheral surface of the cylindrical portion 73B has a guiding surface 73B1 that can be slid on the guiding surface 81a in an axial direction. The cylindrical portion 73B may be formed of a synthetic resin.

In the eleventh embodiment, the cylindrical portion 73B not involved in the magnetic circuit is formed of an aluminum alloy or a synthetic resin, permitting a lighter weight to be achieved.

Furthermore, the electromagnetic clutch follower 73 provided with the guiding surface 81a and the guiding surface 73B1 enables the electromagnetic clutch follower 73 to smoothly connect to an electromagnetic clutch main body 70 when a field coil 71 is energized and to also smoothly disconnect therefrom when the field coil 71 is de-energized. Moreover, to install the electromagnetic clutch follower 73 to the second bracket 81, the guiding surfaces 81a and 73B1 act as positioning means, permitting greater ease of installation.

Twelfth Embodiment

Figure 12:
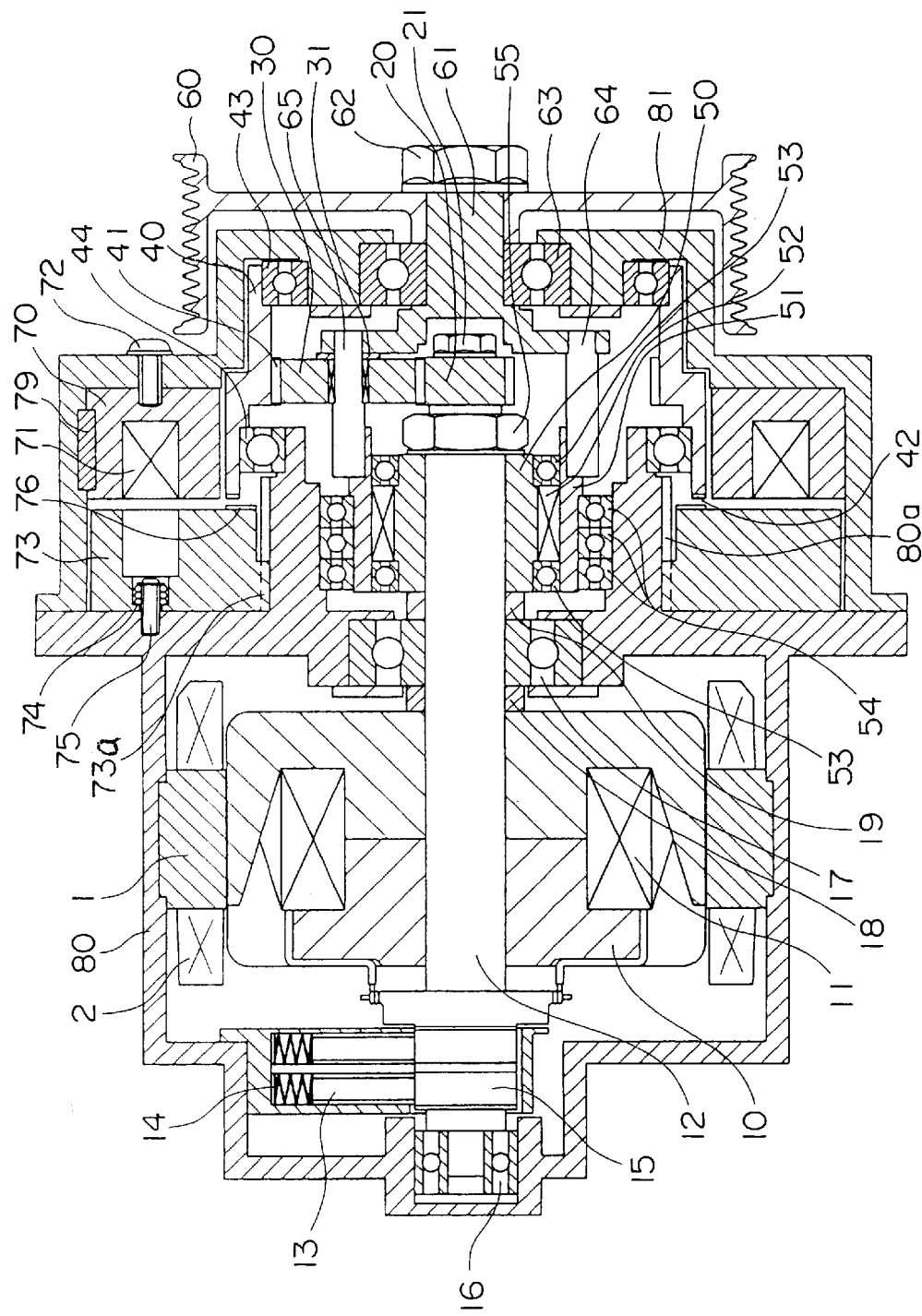
FIG. 12 is a sectional view showing an automotive AC dynamo-electric machine according to a twelfth embodiment in accordance with the present invention.

FIG. 12 is a sectional view showing a dynamo-electric machine according to a twelfth embodiment of the present invention.

The twelfth embodiment differs from the first embodiment in that a concavo-convex guiding surface 80a is formed on an outer periphery surface of a first bracket 80, and a guiding surface 73a is formed on an inside diameter surface of an electromagnetic clutch follower 73 such that it may slide in an axial direction with respect to the guiding surface 80a.

The electromagnetic clutch follower 73 is provided with the guiding surface 80a and the guiding surface 73a, so that the electromagnetic clutch follower 73 smoothly connects to an electromagnetic clutch main body 70 when a field coil 71 is energized and also smoothly disconnects therefrom when the field coil 71 is de-energized. Moreover, to install the electromagnetic clutch follower 73 to the first bracket 80, the guiding surfaces 80a and 73a act as positioning means, permitting greater ease of installation.

Thirteenth Embodiment

Figure 13:
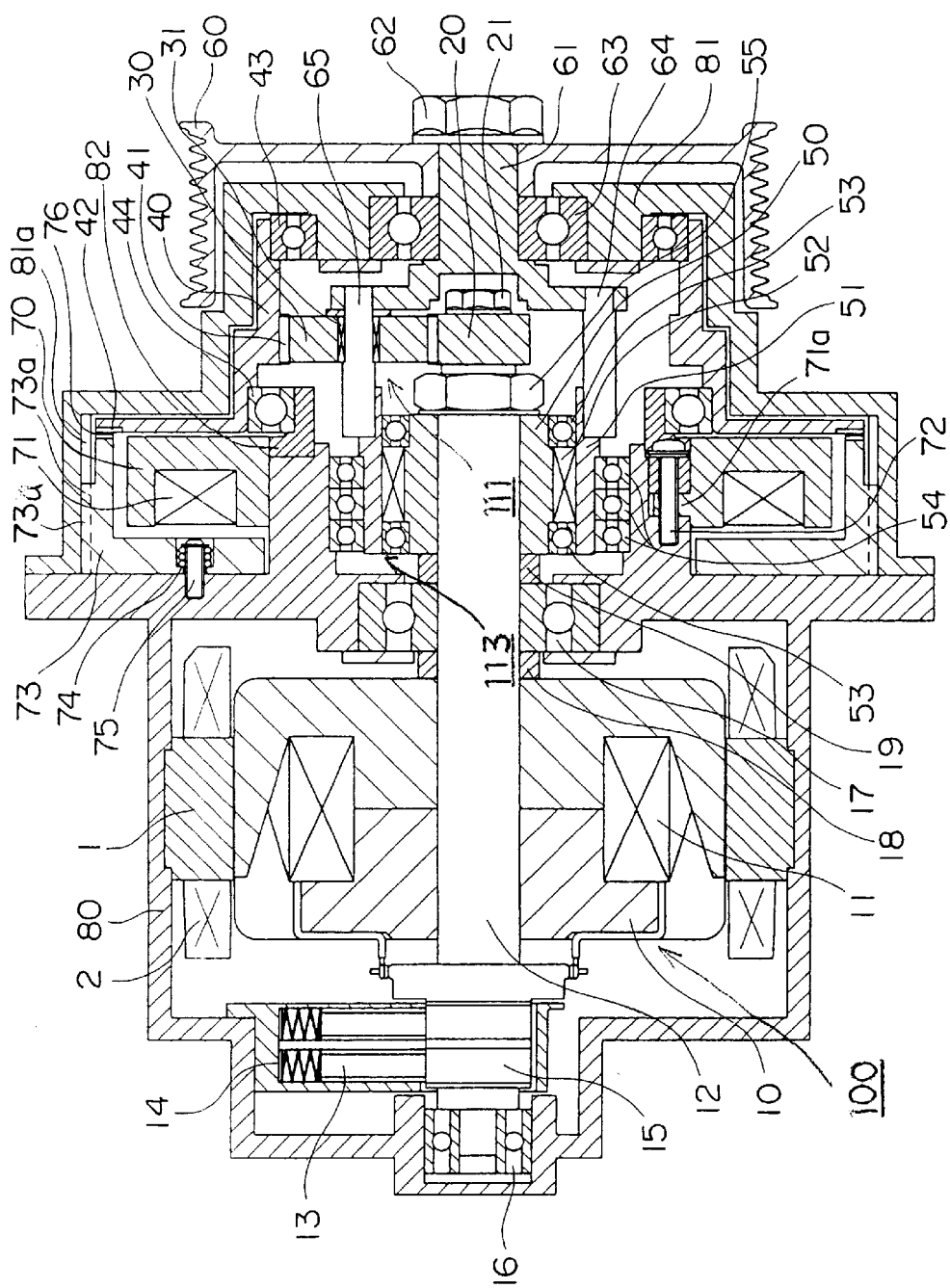
FIG. 13 is a sectional view showing an automotive AC dynamo-electric machine according to a thirteenth embodiment in accordance with the present invention.
Figure 14:
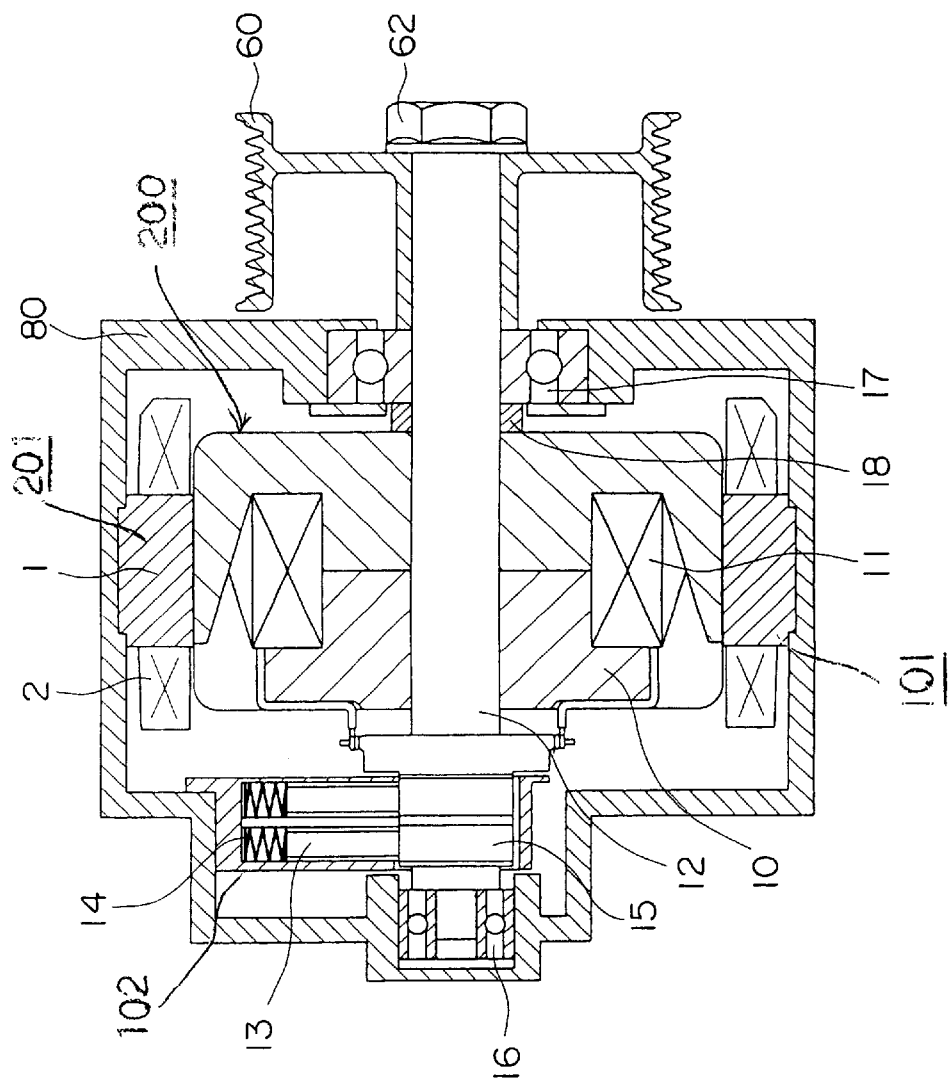
FIG. 14 is a sectional view showing a conventional automotive AC dynamo-electric machine.

FIG. 13 is a sectional view showing a dynamo-electric machine according to a thirteenth embodiment of the present invention.

This embodiment differs from the tenth embodiment in that a concavo-convex guiding surface 81a is formed on an inner wall surface of a second bracket 81, and a guiding surface 73a is formed on an outer surface of an electromagnetic clutch follower 73 such that it may slide in an axial direction with respect to the guiding surface 81a.

In the thirteenth embodiment, the electromagnetic clutch follower 73 is provided with the guiding surface 81a and the guiding surface 73a, so that the electromagnetic clutch follower 73 smoothly connects to an electromagnetic clutch main body 70 when a field coil 71 is energized and also smoothly disconnects therefrom when the field coil 71 is de-energized. Moreover, to install the electromagnetic clutch follower 73 to the second bracket 81, the guiding surfaces 81a and 73a act as positioning means, permitting greater ease of installation.

In the first through thirteenth embodiments described above, the cylindrical member 40 is formed of a nonmagnetic material, such as an aluminum alloy or a synthetic resin.

At least either the bearing 43 (or reference numeral 54 in the fourth, fifth, sixth, seventh, and ninth embodiments) or 44 that rotatably supports the cylindrical member 40 having the internal gear portion 41 on its inner peripheral wall surface employs an angular ball bearing or the like that rotatably supports a resultant load of axial and radial loads.

In the first, tenth, and thirteenth embodiments, a plurality of bearings 54 for the one-way clutch 113 are provided; however, only one bearing 54 may be provided instead.

Regarding the bearings for the cylindrical member 40, either the bearing 43 or 44 alone may be used in the first embodiment (FIG. 1), the eighth embodiment (FIG. 8), and the tenth (FIG. 10) through the thirteenth (FIG. 13). The second embodiment (FIG. 2) may use the bearing 44 alone. In the sixth embodiment (FIG. 6), either the bearing 44 or 54 may be used. The seventh embodiment (FIG. 7) may use the bearing 44 alone. The ninth embodiment (FIG. 9) may use either the bearing 44 or 54 alone.

In the embodiments set forth above, the descriptions have been given of the dynamo-electric machines having rotors wherein field windings are wound around rotor iron cores; however, the present invention can be also applied to dynamo-electric machines, such as squirrel-cage induction machines and magneto synchronous machines.

The V-belts used as the components of the power transmission devices in the above embodiments may be replaced by chains or toothed belts.

As described above, according to the automotive AC dynamo-electric machine of one aspect of this invention, in the motor operation mode, the electromagnetic clutch follower connects to the electromagnetic clutch main body and also engages the cylindrical member to brake the cylindrical member, and the internal gear portion provides a fixed element, so that torque of the rotor is transmitted to the power transmission device via the rotor shaft, the sun gear, the planetary gear, and the carrier. Thus, in relation to the rotational speed of the rotor, the engine can be driven at a product of a speed reduction ratio of the planetary gear assembly and a speed reduction ratio of the power transmission device. Therefore, sufficiently large torque required for starting the engine can be obtained by rotating the rotor at high speed, without the need for increasing the size of the dynamo-electric machine.

Further, in the generator operation mode, the electromagnetic clutch follower disconnects from the electromagnetic clutch main body, and torque from the power transmission device is transmitted to the rotor via the carrier, the planetary gear shaft, the carrier support shaft, the one-way clutch, and the rotor shaft so as to rotate the rotor. Therefore, the rotor can be run at a speed increasing ratio of the power transmission device with respect to a rotational speed of the engine, making it possible to provide sufficient output power required for a vehicle.

Further, according to the automotive AC dynamo-electric machine of one form of this invention, the one-way clutch and the carrier may be rotatably supported at two point by the bracket via a bearing. Therefore, the rigidity of the one-way clutch and the planetary gear assembly is improved, and troubles, such as damage to tooth surfaces caused by, for example, uneven contact of tooth surfaces of the internal gear portion can be reduced. This leads to higher reliability of the planetary gear assembly.

Further, according to the automotive AC dynamo-electric machine of another form of this invention, the one-way clutch may comprise a follower secured to the rotor shaft and a driving member provided on an outer side of the follower via a cam, and an inner ring of a bearing is fitted to the driving member, while an outer ring of the bearing is fitted to an inner wall surface of the cylindrical member. Therefore, the same bearing is shared by the one-way clutch and the cylindrical member, permitting a number of used bearings to be reduced.

Further, according to the automotive AC dynamo-electric machine of still another form of this invention, in the motor operation mode, the electromagnetic clutch follower may connect to the electromagnetic clutch main body and also may engage the cylindrical member to brake the cylindrical member, and the internal gear portion may provide a fixed element, so that torque of the rotor is transmitted to the power transmission device via the rotor shaft, the sun gear, the planetary gear, and the carrier; and in the generator operation mode, the electromagnetic clutch follower disconnects from the electromagnetic clutch main body, and torque from the power transmission device causes the carrier, the one-way clutch, the cylindrical member, the planetary gear, the sun gear, and the rotor shaft to rotate at the same rotational speed so as to rotate the rotor. Thus, in relation to the rotational speed of the rotor, the engine can be driven at a product of a speed reduction ratio of the planetary gear assembly and a speed reduction ratio of the power transmission device. Therefore, sufficiently large torque required for starting the engine can be obtained by rotating the rotor at high speed, without the need for increasing the size of the dynamo-electric machine. Further, the rotor can be run at a speed increasing ratio of the power transmission device with respect to a rotational speed of the engine, making it possible to provide sufficient output power required for a vehicle.

Further, as each end of the carrier and the cylindrical member are rotatably supported in relation to the bracket via same bearing, the bearing is shared by the carrier and the cylindrical member, permitting a number of used bearings to be reduced.

Further, according to the automotive AC dynamo-electric machine of another form of this invention, the carrier may have a first carrier portion secured to a driving member of the one-way clutch and in which a planetary gear shaft may be rotatably provided, and a second carrier portion secured to the first carrier portion and which may be installed via a bearing so that it is rotatable with respect to the bracket. Therefore, when the planetary gear assembly is installed to the first bracket, the planetary gear assembly is installed to the second carrier via the bearing, and the first carrier, which is the counterpart of the second carrier, is fixed to the second carrier via the planetary gear and the planetary gear shaft. This arrangement improves ease of installation.

Further, according to the automotive AC dynamo-electric machine of still another form of this invention, the carrier may have one end thereof secured to the driving member of the one-way clutch, while the other end thereof may be supported by the rotor shaft via a bearing. Therefore, the carrier has a closed structure, making it possible to improve rigidity of the carrier, smoothly mesh the planetary gear with the inner gear member and the sun gear of the cylindrical member, and prevent damage or the like to tooth surfaces due to uneven contact or the like. A result is improved reliability of the planetary gear assembly.

Further, according to the automotive AC dynamo-electric machine of still another aspect of this invention, in the motor operation mode, the electromagnetic clutch follower connects to the electromagnetic clutch main body and also engages the cylindrical member to brake the cylindrical member, and the internal gear portion provides a fixed element, so that torque of the rotor is transmitted to the power transmission device via the rotor shaft, the sun gear, the planetary gear, and the carrier; and in the generator operation mode, the electromagnetic clutch follower disconnects from the electromagnetic clutch main body, and torque from the power transmission device causes the carrier, the one-way clutch, the sun gear, and the rotor shaft to rotate so as to rotate the rotor. Thus, in relation to the rotational speed of the rotor, the engine can be driven at a product of a speed reduction ratio of the planetary gear assembly and a speed reduction ratio of the power transmission device. Therefore, sufficiently large torque required for starting the engine can be obtained by rotating the rotor at high speed, without the need for increasing the size of the dynamo-electric machine. Further, the rotor can be run at a speed increasing ratio of the power transmission device with respect to a rotational speed of the engine, making it possible to provide sufficient output power required for a vehicle.

Further, as the carrier is integrally formed with the pulley, and is rotatably supported with respect to the cylindrical member via a bearing, that allows the number of necessary bearings to be reduced.

Further, according to the automotive AC dynamo-electric machine of one form of this invention, the cylindrical member may have a bottomed cylindrical configuration, and the bottom may be rotatably supported by the rotor shaft via a bearing. Therefore, the bottomed cylindrical member improves the rigidity thereof, and the internal gear portion of the cylindrical member smoothly meshes with the planetary gear, making it possible to prevent damage or the like to tooth surfaces caused by uneven contact or the like. This leads to higher reliability of the planetary gear assembly.

Further, according to the automotive AC dynamo-electric machine of another form of this invention, the carrier may be rotatably supported by the cylindrical member via a bearing, and also rotatably supported by the bracket via a bearing. Therefore, deformation of the carrier caused by load applied by the power transmission device can be prevented, the planetary gear smoothly meshes with the internal gear portion and the sun gear of the cylindrical member, permitting prevention of damage or the like to tooth surfaces due to uneven contact or the like. This results in higher reliability of the planetary gear assembly.

Further, according to the automotive AC dynamo-electric machine of still another form of this invention, vibration absorbing means for absorbing vibration and rotational variations may be provided between the carrier and the one-way clutch. Therefore, load from rotational variations attributable to intracylindrical explosions in an engine and load from sudden rotational variations at a start or stop of an engine are absorbed, so that a service life of the one-way clutch will be prolonged.

Further, according to the automotive AC dynamo-electric machine of one form of this invention, an engaging portion of the electromagnetic clutch follower may be provided on an outer side of the electromagnetic clutch main body, and the engaging portion may engage an engaging portion of the cylindrical member, which opposes the engaging portion of the electromagnetic clutch follower, so as to brake the cylindrical member. Therefore, the dimension of the dynamo-electric machine in the axial direction can be reduced.

Further, according to the automotive AC dynamo-electric machine of another form of this invention, the electromagnetic clutch follower may comprise a disc portion composed of a magnetic material, and a cylindrical portion fixed on an outer periphery of the disc portion and which may surround the electromagnetic clutch main body. Therefore, the cylindrical portion not involved in the magnetic circuit can be formed of an aluminum alloy or a synthetic resin thereby to achieve a reduced weight.

Further, according to the automotive AC dynamo-electric machine of still another form of this invention, an engaging portion of the cylindrical member may be provided on an inside diameter side of the electromagnetic clutch main body, and the engaging portion may engage an engaging portion of the electromagnetic clutch follower, which opposes the engaging portion of the cylindrical member, so as to fix the cylindrical member. Therefore, the radial dimension of the cylindrical member can be reduced, permitting reduced size and weight to be achieved.

Further, according to the automotive AC dynamo-electric machine of one form of this invention, a concavo-convex fixed guiding surface extending in an axial direction may be formed on a bracket retaining the electromagnetic clutch follower, and a concavo-convex movable guiding surface formed on the electromagnetic clutch follower may slide on the fixed guiding surface to enable the electromagnetic clutch follower to be installed to the bracket. Therefore, the electromagnetic clutch follower smoothly connects to the electromagnetic clutch main body when the field coil is energized, and also smoothly disconnects from the electromagnetic clutch main body when the field coil is de-energized.

Furthermore, when the electromagnetic clutch follower may be installed to the bracket, the guiding surfaces serve as the positioning means, permitting greater ease of installation.

Further, according to the automotive AC dynamo-electric machine of another form of this invention, the cylindrical member may be formed of a nonmagnetic material. Therefore, the cylindrical member can be made lighter-weight by employing, for example, an aluminum alloy or a synthetic resin.

Further, according to the automotive AC dynamo-electric machine of still another form of this invention, at least one of a pair of bearings rotatably supporting the cylindrical member may be a bearing that supports a resultant load of an axial load and a radial load. Therefore, the bearing is able to support an axial load of the cylindrical member.

Further, according to the automotive AC dynamo-electric machine of one form of this invention, a radial length of a fixed engaging portion of the cylindrical member may be different from a radial length of a movable engaging portion of an electromagnetic clutch follower engaging the fixed engaging portion. Therefore, even if the two serrated engaging portions are misaligned in the axial direction, the misalignment can be absorbed, thereby ensuring reliable engagement and disengagement of the engaging portions.

Further, according to the automotive AC dynamo-electric machine of another form of this invention, in the motor operation mode, an energizing command for energizing a field coil of the electromagnetic clutch main body so as to brake the cylindrical member may be issued when the engine is at rest. Therefore, the engaging portions can be smoothly engaged without a danger of damage when they engage.

Further, according to the automotive AC dynamo-electric machine of still another form of this invention, in the generator operation mode, a de-energizing command for de-energizing the field coil of the electromagnetic clutch main body so as to release the cylindrical member may be issued after a start of the engine is detected. Therefore, a start failure attributable to a switching error from a start mode to a power generation mode can be prevented.

What is claimed is:

1. An automotive AC dynamo-electric machine capable of bidirectionally transmitting motive power to and from an engine via a power transmission device, and also capable of starting said engine by implementing a motor operation mode and of supplying electric power to a vehicle by implementing a generator operation mode, comprising:

a rotor secured to a rotor shaft provided in a bracket;

a planetary gear assembly including a sun gear secured to an end of said rotor shaft, a planetary gear meshed with the sun gear, a cylindrical member having an internal gear portion which meshes with said planetary gear and is formed on an inner wall surface thereof, a carrier which rotatably supports said planetary gear via a planetary gear shaft penetrating in an axial direction at a central portion of said planetary gear and which is connected to said power transmission device, and a carrier support shaft extending from said carrier in the axial direction;

a one-way clutch which is secured to said rotor shaft and connected to said carrier support shaft and said planetary gear shaft, and enables torque from said carrier support shaft and said planetary gear shaft to be transmitted to said rotor shaft; and an electromagnetic clutch having an electromagnetic clutch main body secured to said bracket, and an electromagnetic clutch follower which is provided opposing said electromagnetic clutch main body and can be connected to and disconnected from said electromagnetic clutch main body, wherein, in the motor operation mode, said electromagnetic clutch follower connects to said electromagnetic clutch main body and also engages said cylindrical member to brake said cylindrical member, and said internal gear portion provides a fixed element, so that torque of said rotor is transmitted to said power transmission device via said rotor shaft, said sun gear, said planetary gear, and said carrier; and in the generator operation mode, said electromagnetic clutch follower disconnects from said electromagnetic clutch main body, and torque from said power transmission device is transmitted to said rotor via said carrier, said planetary gear shaft, said carrier support shaft, said one-way clutch, and said rotor shaft so as to rotate said rotor.

2. An automotive AC dynamo-electric machine according to claim 1, wherein said one-way clutch and said carrier are rotatably supported by said bracket via a bearing.

3. An automotive AC dynamo-electric machine according to claim 1, wherein said one-way clutch comprises a follower secured to said rotor shaft and a driving member provided on an outer side of said follower via a cam, and an inner ring of a bearing is fitted to said driving member, while an outer ring of said bearing is fitted to an inner wall surface of said cylindrical member.

4. An automotive AC dynamo-electric machine according to claim 1, wherein an engaging portion of said electromagnetic clutch follower is provided on an outer side of said electromagnetic clutch main body, and said engaging portion engages an engaging portion of said cylindrical member, which opposes said engaging portion of said electromagnetic clutch follower, so as to brake said cylindrical member.

5. An automotive AC dynamo-electric machine according to claim 4, wherein said electromagnetic clutch follower comprises a disc portion composed of a magnetic material, and a cylindrical portion fixed on an outer periphery of said disc portion and which surrounds said electromagnetic clutch main body.

6. An automotive AC dynamo-electric machine according to claim 1, wherein an engaging portion of said cylindrical member is provided on an inside diameter side of said electromagnetic clutch main body, and said engaging portion engages an engaging portion of said electromagnetic clutch follower, which opposes said engaging portion of said cylindrical member, so as to fix said cylindrical member.

7. An automotive AC dynamo-electric machine according to claim 1, wherein a concavo-convex fixed guiding surface extending in an axial direction is formed on a bracket retaining said electromagnetic clutch follower, and a concavo-convex movable guiding surface formed on said electromagnetic clutch follower slides on said fixed guiding surface to enable said electromagnetic clutch follower to be installed to said bracket.

8. An automotive AC dynamo-electric machine according to claim 1, wherein said cylindrical member is formed of a nonmagnetic material.

9. An automotive AC dynamo-electric machine according to claim 1, wherein at least one of a pair of bearings rotatably supporting said cylindrical member is a bearing that supports a resultant load of an axial load and a radial load.

10. An automotive AC dynamo-electric machine according to claim 1, wherein a radial length of a fixed engaging portion of said cylindrical member is different from a radial length of a movable engaging portion of an electromagnetic clutch follower engaging said fixed engaging portion.

11. An automotive AC dynamo-electric machine according to claim 1, further comprising a controller for carrying out control so that, in the motor operation mode, an energizing command for energizing a field coil of said electromagnetic clutch main body so as to brake said cylindrical member is issued when said engine is at rest.

12. An automotive AC dynamo-electric machine according to claim 1, further comprising a controller for carrying out control so that, in the generator operation mode, a de-energizing command for de-energizing the field coil of said electromagnetic clutch main body so as to release said cylindrical member is issued after a start of said engine is detected.

13. An automotive AC dynamo-electric machine capable of bidirectionally transmitting motive power to and from an engine via a power transmission device and also capable of starting said engine by implementing a motor operation mode and of supplying electric power to a vehicle by implementing a generator operation mode, comprising:

a rotor secured to a rotor shaft provided in a bracket;

a planetary gear assembly including a sun gear secured to an end of said rotor shaft, a planetary gear meshed with said sun gear, a cylindrical member having an internal gear portion which meshes with said planetary gear and is formed on an inner wall surface thereof, and a carrier which rotatably supports said planetary gear via a planetary gear shaft penetrating in an axial direction at a central portion of said planetary gear and which is connected to said power transmission device;

a one-way clutch provided between said carrier and said cylindrical member and which enables torque from said power transmission device to be transmitted to said rotor shaft; and an electromagnetic clutch having an electromagnetic clutch main body secured to said bracket, and an electromagnetic clutch follower which is provided opposing said electromagnetic clutch main body and can be connected to and disconnected from said electromagnetic clutch main body, wherein, in the motor operation mode, said electromagnetic clutch follower connects to said electromagnetic clutch main body and also engages said cylindrical member to brake said cylindrical member, and said internal gear portion provides a fixed element, so that torque of said rotor is transmitted to said power transmission device via said rotor shaft, said sun gear, said planetary gear, and said carrier; and in the generator operation mode, said electromagnetic clutch follower disconnects from said electromagnetic clutch main body, and torque from said power transmission device causes said carrier, said one-way clutch, said cylindrical member, said planetary gear, said sun gear, and said rotor shaft to rotate at the same rotational speed so as to rotate said rotor.

14. An automotive AC dynamo-electric machine according to claim 13, wherein said carrier has a first carrier portion secured to a driving member of said one-way clutch and in which a planetary gear shaft is rotatably provided, and a second carrier portion secured to said first carrier portion and which is installed via a bearing so that it is rotatable with respect to said bracket.

15. An automotive AC dynamo-electric machine according to claim 13, wherein said carrier has one end thereof secured to said driving member of said one-way clutch, while the other end thereof is supported by said rotor shaft via a bearing.

16. An automotive AC dynamo-electric machine according to claim 15, wherein said carrier is rotatably supported by said cylindrical member via a bearing, and also rotatably supported by said bracket via a bearing.

17. An automotive AC dynamo-electric machine capable of bidirectionally transmitting motive power to and from an engine via a power transmission device and also capable of starting said engine by implementing a motor operation mode and of supplying electric power to a vehicle by implementing a generator operation mode, comprising:

a rotor secured to a rotor shaft provided in a bracket;

a planetary gear assembly including a sun gear secured to an end of said rotor shaft, a planetary gear meshed with said sun gear, a cylindrical member having an internal gear portion which meshes with said planetary gear and is formed on an inner wall surface thereof, and a carrier which rotatably supports said planetary gear via a planetary gear shaft penetrating in an axial direction at a central portion of said planetary gear and which is connected to said power transmission device;

a one-way clutch provided inside said carrier such that it is made integral with said sun gear, and which enables torque from said power transmission device to be transmitted to said rotor shaft via said sun gear; and an electromagnetic clutch having an electromagnetic clutch main body secured to said bracket, and an electromagnetic clutch follower which is provided opposing said electromagnetic clutch main body and can be connected to and disconnected from said electromagnetic clutch main body, wherein, in the motor operation mode, said electromagnetic clutch follower connects to said electromagnetic clutch main body and also engages said cylindrical member to brake said cylindrical member, and said internal gear portion provides a fixed element, so that torque of said rotor is transmitted to said power transmission device via said rotor shaft, said sun gear, said planetary gear, and said carrier; and in the generator operation mode, said electromagnetic clutch follower disconnects from said electromagnetic clutch main body, and torque from said power transmission device causes said carrier, said one-way clutch, said sun gear, and said rotor shaft to rotate so as to rotate said rotor.

18. An automotive AC dynamo-electric machine according to claim 17, wherein said cylindrical member has a bottomed cylindrical configuration, and the bottom is rotatably supported by said rotor shaft via a bearing.

19. An automotive AC dynamo-electric machine according to claim 17, wherein vibration absorbing means for absorbing vibration and rotational variations is provided between said carrier and said one-way clutch.

* * * * *